(12) United States Patent
Cappelletti et al.

(10) Patent No.: US 6,950,460 B1
(45) Date of Patent: Sep. 27, 2005

(54) MULTICHANNEL TRANSCEIVER OF DIGITAL SIGNALS OVER POWER LINES

(75) Inventors: Roberto Cappelletti, Cornaredo (IT); Giuseppe Cantone, Siracusa (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 432 days.

(21) Appl. No.: 09/699,041

(22) Filed: Oct. 27, 2000

(30) Foreign Application Priority Data

Oct. 28, 1999 (EP) .................................. 99830680

(51) Int. Cl.[7] .............................................. H04B 1/38
(52) U.S. Cl. .................................................... 375/222
(58) Field of Search .............................. 375/219, 220, 375/222, 223; 370/335, 342, 352, 353, 354, 370/355, 356; 340/310.01, 310.02, 310.06, 340/538; 455/402, 270

(56) References Cited

U.S. PATENT DOCUMENTS

| | | | | |
|---|---|---|---|---|
| 4,538,224 A | * | 8/1985 | Peterson | ...................... 710/22 |
| 5,157,519 A | * | 10/1992 | Jacobs | ...................... 358/470 |
| 5,615,211 A | * | 3/1997 | Santore et al. | .............. 370/419 |
| 5,777,991 A | * | 7/1998 | Adachi et al. | .............. 370/352 |
| 5,892,758 A | * | 4/1999 | Argyroudis | .................. 370/335 |

FOREIGN PATENT DOCUMENTS

| | | | | |
|---|---|---|---|---|
| EP | 0634842 | | 1/1995 | ............ H04B 3/54 |
| WO | 9403002 | | 2/1994 | ........... H04J 13/00 |

* cited by examiner

*Primary Examiner*—Don N. Vo
(74) *Attorney, Agent, or Firm*—Lisa K. Jorgenson; Allen, Dyer, Doppelt, Milbrath & Gilchrist, P.A.

(57) ABSTRACT

A data transceiving station of digital data frames includes a digital modem coupled to a transmission line, and a microprocessor receiving demodulated data from the modem according to a Packet Mode or a Bit Mode transmission through an interface circuit. The interface circuit switches between the Packet Mode and the Bit Mode transmission during transfer of a data frame to the microprocessor. The data transceiving station combines the superior speed of a Packet Mode transfer with the unlimited compatibility of a Bit Mode transfer.

36 Claims, 7 Drawing Sheets

MULTICHANNEL TRANSCEIVER OF DIGITAL SIGNALS OVER POWER LINES

FIELD OF THE INVENTION

The present invention relates to data transmission systems, and, more particularly, to a digital signal transceiver for home applications, specially, though not exclusively, coupled to an electrical power distribution line.

BACKGROUND OF THE INVENTION

Electric power distribution networks are widespread and are capillary like. These networks primarily transport and distribute electric energy, but the possibility of exploiting it also as a medium for data transmission is well known. Electrical mains can be advantageously used to establish communication with far away locations exploiting the fact that even remote rural users are reached by an electrical power line. It is also possible to avoid the cost of a dedicated line (e.g., a telephone line) for telecommunications.

Data transmission on electrical mains is possible since AC power is distributed with a well determined frequency. Signal modulation techniques permit the transmission of information on or about a certain carrier frequency that may advantageously be in a frequency band not occupied by other signals. It is possible to transmit on the same line several signals, each occupying a different frequency band. The receiver selects the desired signal by tuning to the relative carrier frequency.

Data transmission on power lines may be a particularly efficient technique for controlling machines installed in a remote location, without being forced to install a dedicated telecommunication line. Because of the advantages provided by such a data transmission technique, transceivers for coupling to power lines have an increasing importance.

A telecommunication station coupled to power lines generally includes a microprocessor interfaced with a transceiver coupled to the power line. Power line transceivers are well known and commercially available. Examples of effective transceivers are described in U.S. Pat. No. 4,714,912 and U.S. Pat. No. 5,842,032.

Generally, known transceivers do not directly interface with a microprocessor. Moreover, these transceivers require dedicated interface devices for coupling with the electrical mains to meet the requirements of the communication standards on the network, establishing access criterions, avoiding frequency bands reserved to electricity producers and frequency bands reserved for home applications. It would be desirable to have a fully integrated transceiver allowing the realization of a telecommunication station with the above mentioned characteristics, capable of supporting the remote managing of electrical loads connected to the electrical mains.

Often the conditions for using such a telecommunication system on electrical power lines are those of communicating with people at their homes, such as in applications generally referred as home applications. In these application areas, the cost of apparatuses has a great importance.

Usually a digital data transceiving station specifically uses a multichannel transceiver coupled through an appropriate interface to an electrical power distribution network. Also, the digital data transceiving station may generally comprise a modem interfaced with a microprocessor by way of a specific communication circuit between the modem and the microprocessor, commonly called a serial interface.

In known systems, the possible choices are either to establish a Bit Mode or a Packet Mode communication between the modem and the microprocessor through the serial interface. Binary serial transmission between the modem and the microprocessor can be made in two different ways. The first is the data transceiving station, where each time the modem has a demodulated bit, it transmits it to the microprocessor. The second is the Packet Mode. In this mode the modem stores a pre-established number of bits forming a packet of bits that eventually is transmitted to the microprocessor.

Bit Mode communication between the modem and the microprocessor does not introduce any data format because bits are transmitted immediately after the modem has decoded them. It is easy to understand that the Bit Mode has the advantage of being usable irrespective of any particular data format, but its drawback is that the rate of communication between the modem and the microprocessor is limited to that of the communication channel.

In contrast, in Packet Mode communication the rate of communication between the modem and the microprocessor can be greater than that over the channel. However, it is not independent of the particular data format. Bit Mode communication ensures compatibility of the system irrespective of the data format used, but this approach imposes the use of a microprocessor having adequate computing capacities to interpret the bit stream received by the serial interface for its information content.

The technical alternative of establishing a Packet Mode communication between the modem and the microprocessor is advantageous because it ensures a faster communication and allows the use of a relatively low cost microprocessor for the same global performances of the station. However, it is usable only by operating with a certain predefined data format.

For example, if the protocol format has data in frames being transmitted with a preamble followed by a header and by a data field alternated with synchronization signals, formatting the preamble into packets would destroy its information content. If data were formatted in M bit words and the Packet Mode transmission forms packets of N bits, the microprocessor would be forced to process the received data to extract the original M bit words. This would waste the benefits of the greater communication speed that may be achieved with a Packet Mode transmission.

Therefore, there is a clear need and/or utility of having a digital data transceiver wherein communication between the modem and the microprocessor through the serial interface may switch back and forth between a Bit Mode and a Packet Mode during the time slot in which a single data frame is transmitted. This switching is done without any loss of data.

SUMMARY OF THE INVENTION

An object of the present invention is to provide a digital data transceiving station joining together in an optimal manner the advantages of a Packet Mode transmission with the advantages of a Bit Mode transmission, thus providing enhanced speed performances even using a relatively low cost microprocessor.

The transceiving station of the invention is characterized in that during the transmission of each single data frame between the modem and the microprocessor, the serial interface switchs from a Packet Mode to a Bit Mode communication without losing data.

According to a preferred embodiment of the invention, the data transceiver of the invention is directly connectable to a coupling circuit to a line of a power distribution network via an integrated interface circuit. The modem produces an information of detection in a selected transmission band of a signal energy level greater than a pre-established threshold level. Preferably, the integrated data transceiver of the invention also comprises a circuit that detects the zero crossing of the power network voltage. This produces a logic signal that is input to the modem.

According to another aspect of the invention, the station is based on the use of a monolithically integrated multi-channel transceiver of digital data to be connected to a line of a power distribution network. The transceiver comprises a modem having a register for data storage, and a circuit for controlling their integrity and for signaling the eventual corruption of at least one bit. A serial interface communicates with an external microprocessor. The transceiver further includes an oscillator generating carrier frequencies that are fed to the modem, and a power line interface circuit coupled to the modem for driving an external circuit coupling with the power line. A circuit detects the zero-crossing of the network voltage and produces a logic signal that is fed to an input of the modem.

According to the present invention, the data transmission section of the serial interface of the transceiver includes a buffer and a logic circuit that processes the demodulated bit stream coming from the modem. The logic circuit is enabled by an enabling signal and functions with a clock having a frequency multiple of the demodulated bit stream frequency. The enabling signal and the multiple clock signal are both generated by a control logic circuit of the serial interface as a function of a command issued by an external microprocessor.

A multiplexer receives on a first input the nonformatted bit stream output by the modem and on a second input a packet reorganized data flow produced by the processing circuit. The same enabling signal of the processing circuit operates also the selection by the multiplexer, outputting towards the external microprocessor a bit stream (Bit Mode) as decoded by the modem or a flow of data organized in packets (Packet Mode) from the processing circuit.

BRIEF DESCRIPTION OF THE DRAWINGS

The different aspects and advantages of the invention will be evidenced in the following description of embodiments of the invention and by referring to the attached drawings, wherein:

FIG. 4b is a timing of important signals of the transmitting section of the serial interface illustrated in FIG. 4a;

DETAILED DESCRIPTION OF THE PREFERRED EMBODIMENTS

Figure 1:
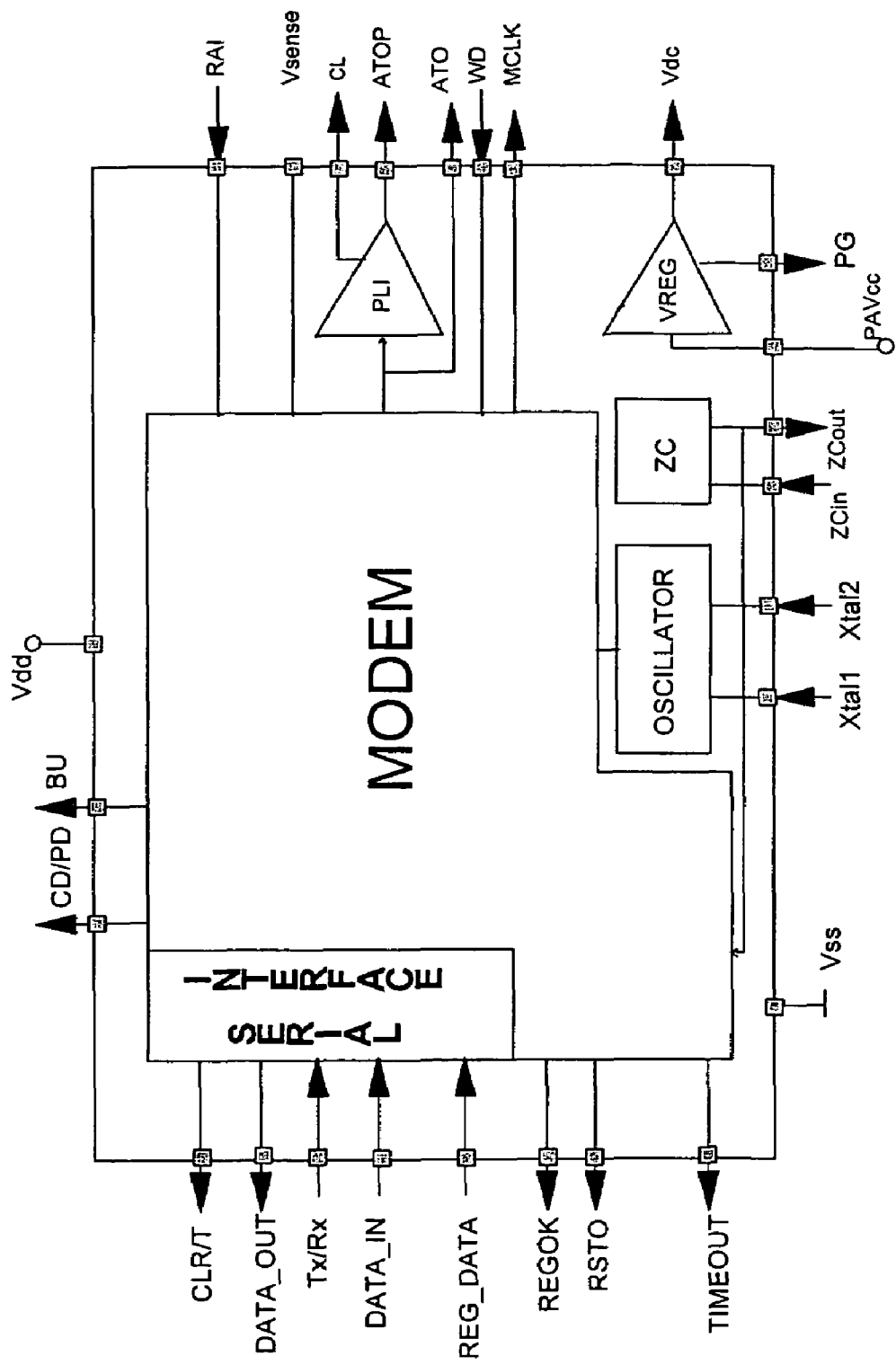
FIG. 1 is a general block diagram of the integrated transceiver according to the present invention.

The integrated transceiver of the invention is depicted schematically in FIG. 1, and is formed by a digital modem MODEM which may be a frequency shift keying (FSK) modem, for example. A serial interface circuit SERIAL_INTERFACE allows the modem to communicate external the integrated transceiver. The integrated transceiver further includes an oscillator OSCILLATOR providing carrier frequencies to the modem, a power interface PLI for driving an external coupling circuit to a line of the electrical power distribution network, and a zero-cross detector ZC of the network voltage. Optionally, a monolithically integrated voltage regulator VREG is also present for powering other ICs that may be present in the transceiving station.

During a receiving phase, the signal derived from the power network line is received on the pin RAI, demodulated and made available on the pin DATA_OUT. Optionally, the transceiver may produce on the pin CLR/T a clock signal for bit synchronization. The integrated transceiver provides on the pin BU information about the detection of an energy level greater than a fixed threshold, e.g., 80 dB$\mu$V, in a selected frequency band. Such information allows the use of the communication channel on an electrical power line in the frequency band reserved to home applications.

According to the CENELEC EN 50065-1 rules defining the European criteria for access to such a telecommunication medium, it is prohibited to transmit in the frequency band reserved to home applications if on the channel there is a signal stronger than 80 dB$\mu$V. By having the modem implementing this energy detection function in a selected band, realization of dedicated external circuitry for filtering and amplitude monitoring is avoided.

Another peculiarity of the integrated circuit of the invention is the fact that it integrates a circuit ZC that detects the zero-crossing of the network voltage by comparing a replica signal of the network voltage fed to the pin ZCIN. The zero-crossing information is produced on the pin ZCOUT, and in addition to making it available to the external world (microprocessor) it is input to the modem for synchronizing the transmission with the zero-crossing of the network voltage.

In this way, appliances connected to the electrical power network, besides receiving command data sent by the transceiver, receive also the information of the instant in which the network voltage is zero. Such information is useful to drive certain electric loads. Knowing the instant in which the network voltage is zero may be usefully exploited for determining the turn-on and turn-off instants of loads. This avoids voltage peaks on power switches. When there is not a need to synchronize the transmission with the zero-crossing of the network voltage, the transceiver may be programmed to ignore the relative signal on the ZCOUT mode.

Figure 2:
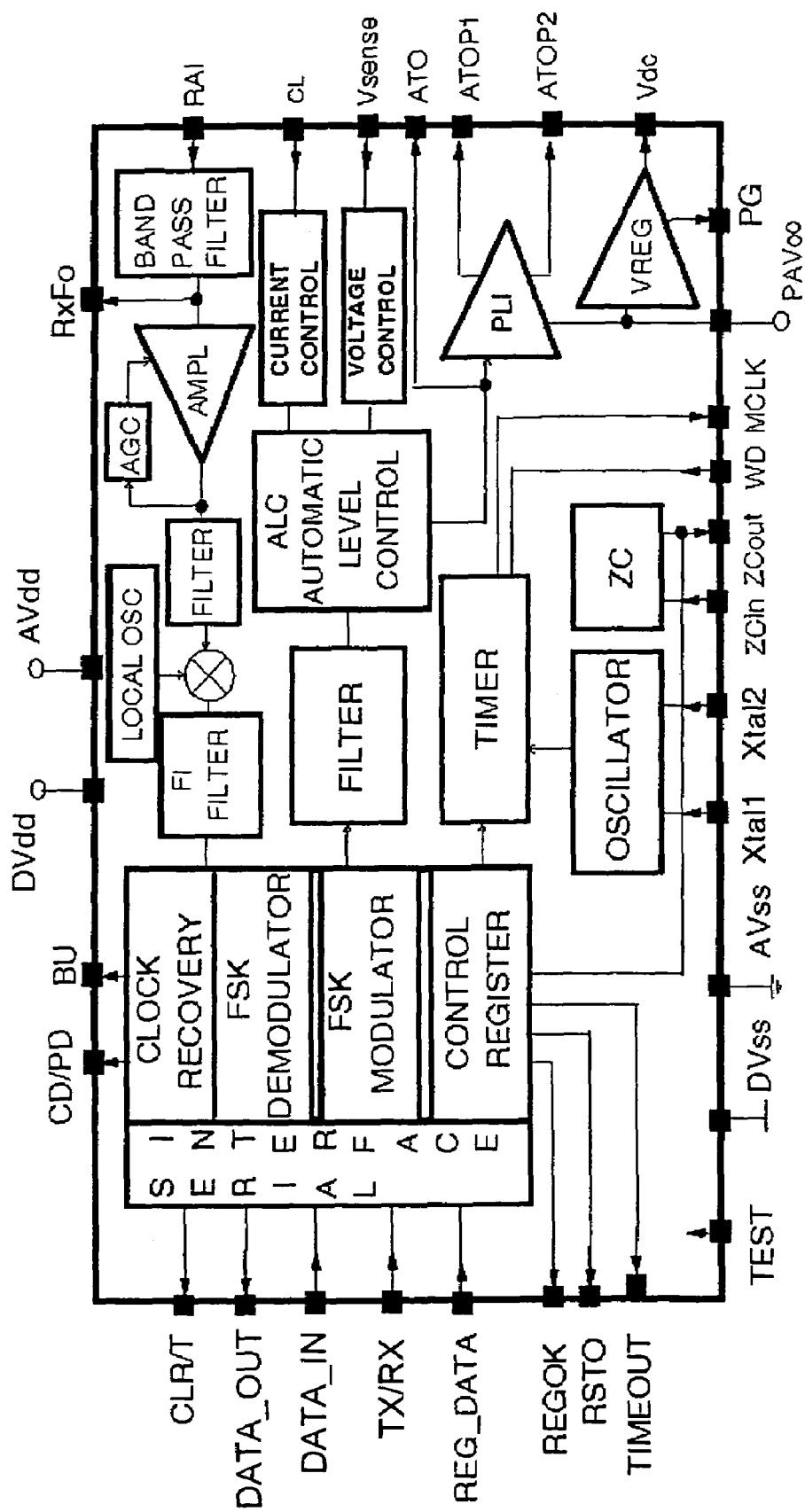
FIG. 2 is a more detailed block diagram of certain blocks of the general diagram illustrated in FIG. 1, according to an embodiment of the present invention.

A preferred embodiment of the integrated transceiver of the invention is depicted in FIG. 2, wherein different blocks forming the modem are highlighted. In the illustrated example, the modem is an FSK type. The signal present on the pin RAI is demodulated by a receiver, such as a superheterodyne receiver, for example. The demodulated signal is fed to a CLOCK_RECOVERY block.

The signal present on the pin RAI is filtered and made available after the band-pass filter on the pin RxFo. This provides a measure of the power of the signal in the selected band. The pin CD/PD of the transceiver of the invention has two functions. Through this pin the presence of a carrier in the selected channel (carrier detection) can be signaled independently of the amplitude of the carrier. This is for communicating the possibility that a message could be arriving. The detection threshold is determined by the modem sensitivity at the input pin RAI. The other function is to communicate that a bit stream is being received with the selected bit-rate (preamble detection).

Upon recovering the clock signal, the block FSK_DEMODULATOR provides the demodulated signal to the SERIAL_INTERFACE block which outputs it on the pin DATA_OUT. The SERIAL INTERFACE block conveys data from the FSK_DEMODULATOR to the outside world and from the outside world to the FSK_MODULATOR. This is done under the control of a signal TX/RX specifying which one of the two operations must be carried out.

Moreover, the transceiver is provided with a control register CONTROL_REGISTER where the parameters necessary to the transceiver are stored. These parameters define the modem configuration. Because of the high electromagnetic noise that is normally present on the power line, the content of the CONTROL_REGISTER is continuously monitored to ensure a reliable security margin on the integrity of the data stored in it. In case of corruption of the stored data, an alarm signal is produced on the pin REG_OK.

Moreover, the CONTROL_REGISTER is provided with a pin TIMEOUT to support the use of protocols that contemplate the interruption of the transmission at pre-established time intervals, as measured by the block TIMER. The CONTROL_REGISTER can be externally programmed by way of the control signal REG_DATA. Such a signal communicates to the SERIAL_INTERFACE whether the signal DATA_IN, coming from outside, is data to store in the CONTROL_REGISTER or is data to be fed to the FSK_MODULATOR. By programming the CONTROL_REGISTER it is possible to make the information on preamble detection available on the pin CD/PD.

The signal produced by the FSK_MODULATOR is filtered by a programmable band pass filter FILTER which reduces all undesired harmonic components to reduce the electromagnetic noise. The filtered signal is input to the power interface PLI by way of an amplitude control stage ALC. Regulation of the voltage level and of the current level of the transmitted signal is performed by the relative blocks of current mode control CURRENT_CONTROL and of voltage mode control VOLTAGE_CONTROL. These signals are representative of the current CL and of the voltage VSENSE.

The transmission carrier frequencies are derived from the oscillation of an external quartz coupled to the pins XTAL1 and XTAL2. The oscillation is kept resonant by an excitation circuit integrated in the device. Preferably, the excitation circuit includes a MOS stage operating below its threshold level to limit absorption. From the oscillator is derived a clock signal that is made available on the pin MCLK to drive an external microprocessor for optionally avoiding use of other resonators.

Preferably, the transceiver has a pin WD dedicated to the supervision of the transmission. To preserve the communication channel, the transceiver monitors the signal present on the pin WD. If during a pre-established time interval, as measured by the block TIMER, no transition has been observed, the control register interprets this fact as a failure and communicates to the external world an alarm by way of the signal RSTO.

The signal RSTO can be conveniently used even to signal the presence of a voltage level, as produced by the regulator VREG, insufficient to make the transceiver station operate correctly. To this effect, the voltage regulator VREG is provided with a pin PG on which the information of the presence of an output voltage of the regulator VREG greater than a minimum pre-established value is provided, such as 4 to 5 V, for example.

In FIG. 2 the supply pins for the digital and analog sections are indicated by DVdd, DVss, Avdd, and AVss, and the supply pin of the power interface is PAVcc. The pin TEST is used for functionality testing of the integrated device.

Figure 3:
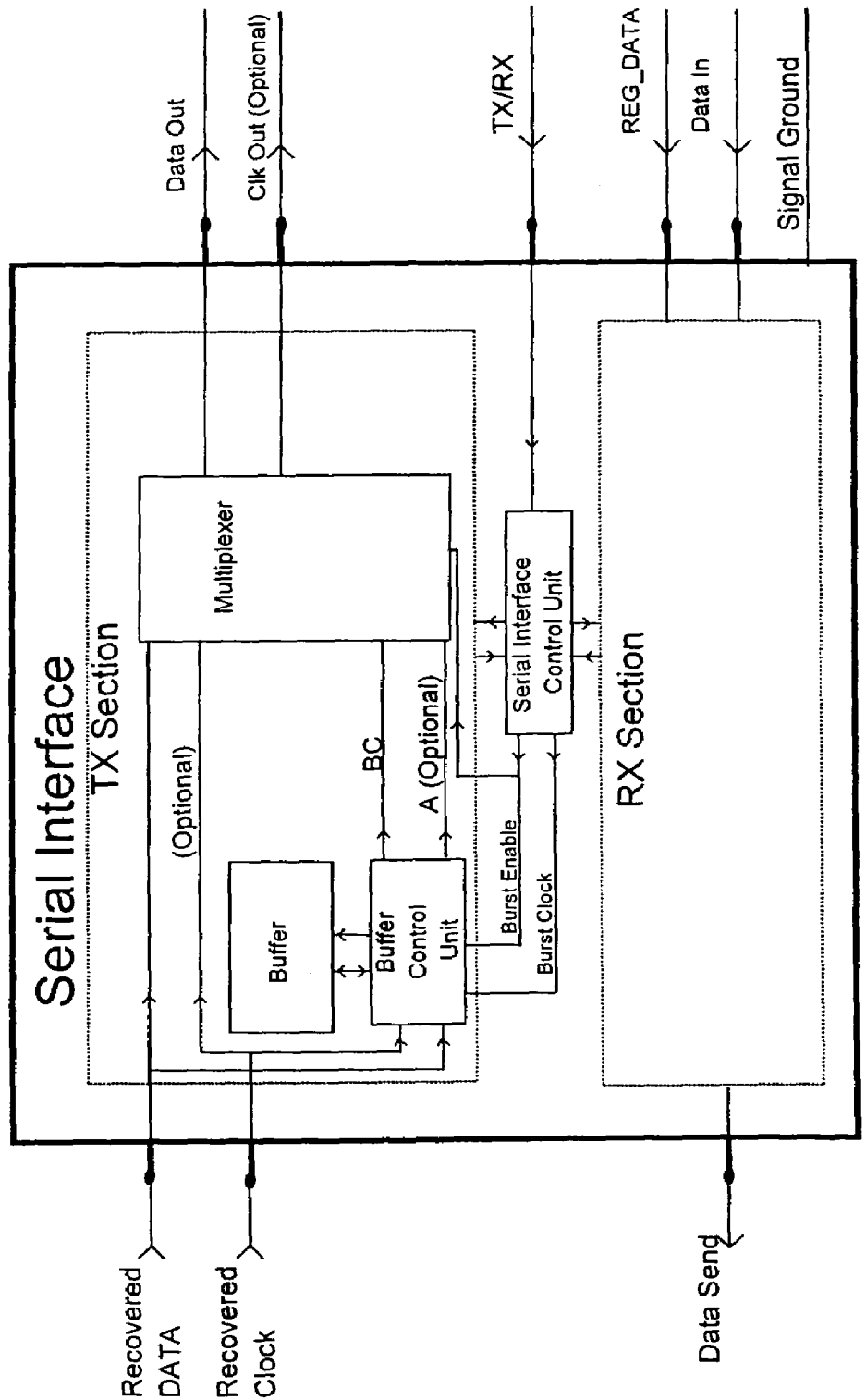
FIG. 3 is a block diagram of the serial interface of the integrated transceiver according to the present invention.

A diagram of the SERIAL_INTERFACE block is depicted in FIG. 3. It comprises a receiving section RX_SECTION, a transmitting section TX_SECTION, and a SERIAL_INTERFACE_CONTROL_UNIT. The line SIGNAL_GROUND provides the reference voltage for data reading. The receiving section RX_SECTION receives a data signal DATA_IN and produces an output signal DATA_SEND that is fed either to the FSK_MODULATOR block or to the CONTROL_REGISTER, depending on the control signal REG_DATA.

The TX_SECTION comprises a logic processing circuit BUFFER_CONTROL_UNIT using a working memory, BUFFER, and an output MULTIPLEXER. The BUFFER_CONTROL_UNIT receives the bit stream RECOVERED_DATA output by the demodulator at a certain clock frequency RECOVERED_CLOCK, and uses a clock signal BURST_CLOCK having a frequency that is generally a multiple of the frequency of the clock of the received bit stream. This is done to perform data organization in packets according to a certain format.

When enabled by the enabling signal BURST_ENABLE, the logic processing circuit BUFFER_CONTROL_UNIT reads the data stored in the working memory BUFFER at the scanning frequency of the BURST_CLOCK and produces on an input of the MULTIPLEXER a data stream BC organized according to a Packet Mode format.

The input bit stream RECOVERED_DATA, besides being fed to the logic processing circuit, is also fed to a second input of the MULTIPLEXER. The SERIAL_INTERFACE_CONTROL_UNIT, besides activating alternately the receiving section RX_SECTION and the transmitting section TX_SECTION, depends on an external command TX/RX. The signal BURST_ENABLE and the clock signal BURST_CLOCK are produced with a frequency multiple of the clock frequency of the bit stream, and is used by the BUFFER_CONTROL_UNIT and by the MULTIPLEXER to operate the mode selection.

Optionally, even a clock signal (CLR/T) relative to the selection of a data flow in the Bit Mode or in the Packet Mode can be output. In this case, the logic processing circuit BUFFER_CONTROL_UNIT feeds to other inputs of the MULTIPLEXER a third clock signal A formed by sequences of a pre-established number of pulses of the BURST_CLOCK. These pulses are periodically generated at pre-established intervals and are applied to the clock of the input bit stream RECOVERED_CLOCK.

The BURST_ENABLE signal enables or disables the logic processing circuit BUFFER_CONTROL_UNIT and selects using the MULTIPLEXER the output data stream DATA_OUT. This corresponds to the input bit stream (Bit Mode) RECOVERED_DATA and optionally also the relative clock RECOVERED_CLOCK on the CLR/T output, or to the BC stream of data organized in packets (Packet Mode) by the BUFFER_CONTROL_UNIT and optionally also the relative clock signal A on the CLR/T output.

Figure 4A:
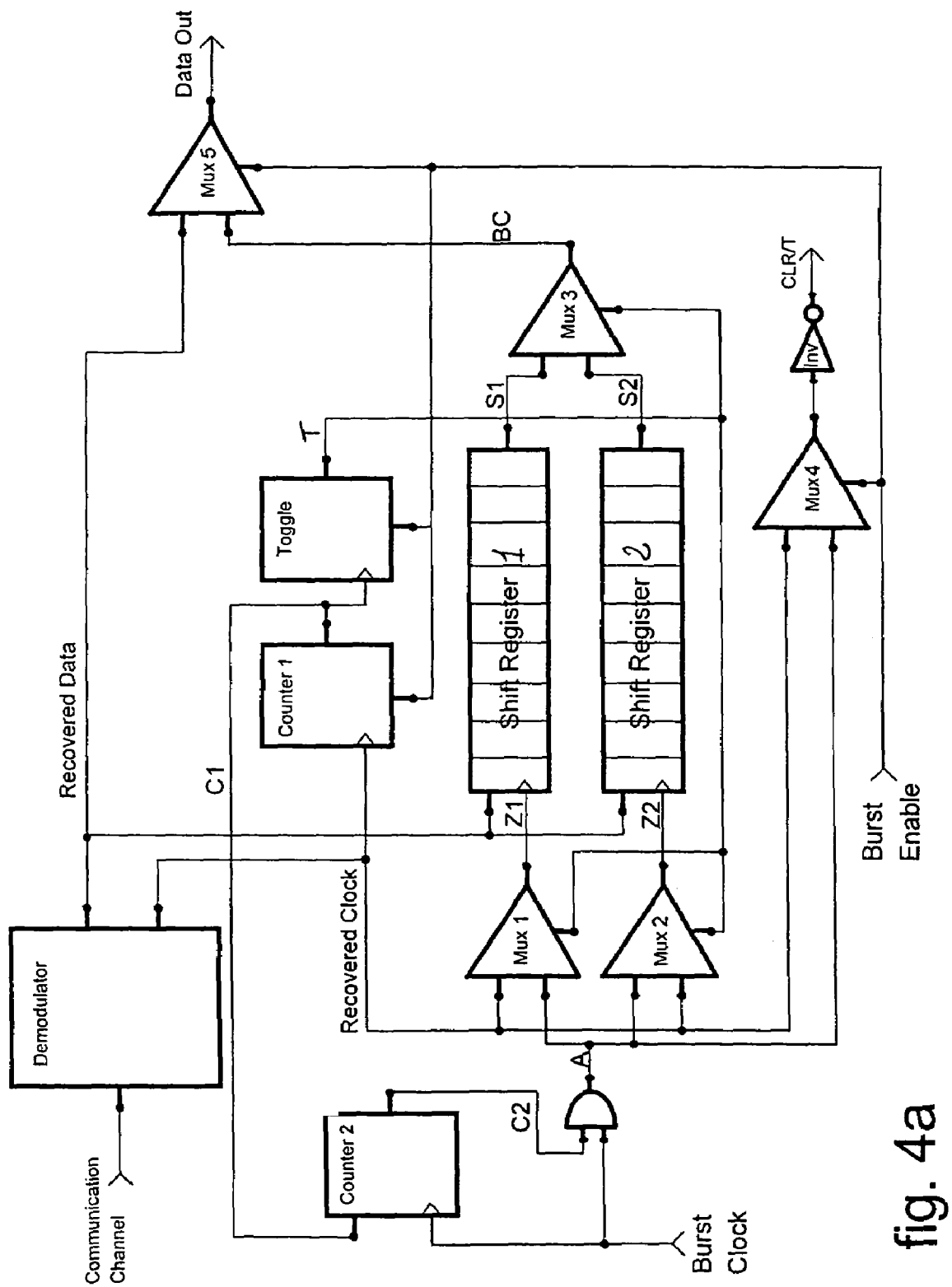
FIG. 4a is a circuit diagram of the transmitting section of the serial interface of the transceiver according to the present invention.

An effective embodiment of the transmitting section TX_SECTION of the serial interface is depicted in FIG. 4a. The circuit is composed of a pair of shift registers SHIFT_REGISTER_1 and SHIFT_REGISTER_2, having the capacity equal to a bit length N of a packet. The two registers are paralleled, fed with the RECOVERED_DATA bit stream and their outputs are coupled to respective inputs of the multiplexer MUX3. The two registers store and unload the bits forming a packet.

Data storage is performed at a frequency equal to the bit stream frequency RECOVERED_CLOCK, while the data unloading is performed at the multiplied frequency of the BURST_CLOCK. A switching signal T, produced by the logic block TOGGLE, prevents the two registers SHIFT_REGISTER_1 and SHIFT_REGISTER_2 from performing the same operation at the same time. This insures that the multiplexer MUX3 coupled to the outputs of the registers coordinately selects the output of the register that is unloading the stored data. The signal T switches every N pulses of the RECOVERED_CLOCK, making the input multiplexers MUX1 and MUX2 feed the respective shift register. One is in synchronization with the RECOVERED_CLOCK and the other with a third clock signal A.

The modulus N first counter COUNTER_1 enabled by the BURST_ENABLE outputs a first end-computation signal C1 every N pulses of the RECOVERED_CLOCK. The first end-computation signal C1 makes the signal T switch, and enables the modulus N counter COUNTER_2 that produces a second end-computation signal C2 activated at the instant the counter is enabled for as long as N pulses of the BURST_CLOCK have been counted. Upon counting N pulses, COUNTER_2 disables the signal C2.

The third clock signal A is produced by performing a logic AND of the second end-computation signal C2 and of the BURST_CLOCK. Therefore, the clock signal A corresponds to the period of sequences of N pulses of the BURST_CLOCK repeating at each activation of the first end-computation signal C1.

Therefore, the multiplexers MUX1 and MUX2 are fed with a signal having N pulses of the BURST_CLOCK at the instant in which one of the two registers is full. Using the switching signal T, the N pulses are input to the register that has just reached the full state, thus unloading the packet formed by the N bits stored in it.

To output also the clock signal CLR/T wherein the bits are output as DATA_OUT according to the selection operated between the Bit Mode and Packet Mode, it can be produced by a multiplexer MUX4 for outputting either the RECOVERED_CLOCK or the third clock signal A. This depends on whether the signal BURST_ENABLE establishes a Bit Mode or a Packet Mode transmission. An output multiplexer MUX5 outputs the bit stream DATA_OUT in Packet Mode or in Bit Mode according to the selection operated by the signal BURST_ENABLE.

The described architecture is just one among many according to the diagram of FIG. 3. Other circuit approaches are possible. For example, a RAM memory or a circular register may be used instead of the pair of shift registers and by adapting the BUFFER_CONTROL_UNIT to produce the appropriate signals to manage the particular type of storages used.

The above described SERIAL_INTERFACE allows switching between Bit Mode and Packet Mode data transmission to the microprocessor by just varying the BURST_ENABLE signal during transmission of a data frame. This ability allows the transmission of the message to be sent exploiting both the versatility of a Bit Mode transmission and the superior speed of a Packet Mode transmission. A portion of the data frame may be transmitted in Bit Mode and the remaining portion in Packet Mode, and the two modes of transmission may alternate in whichever order without causing any bit loss while switching from one transmission mode to the other.

Figure 4B:
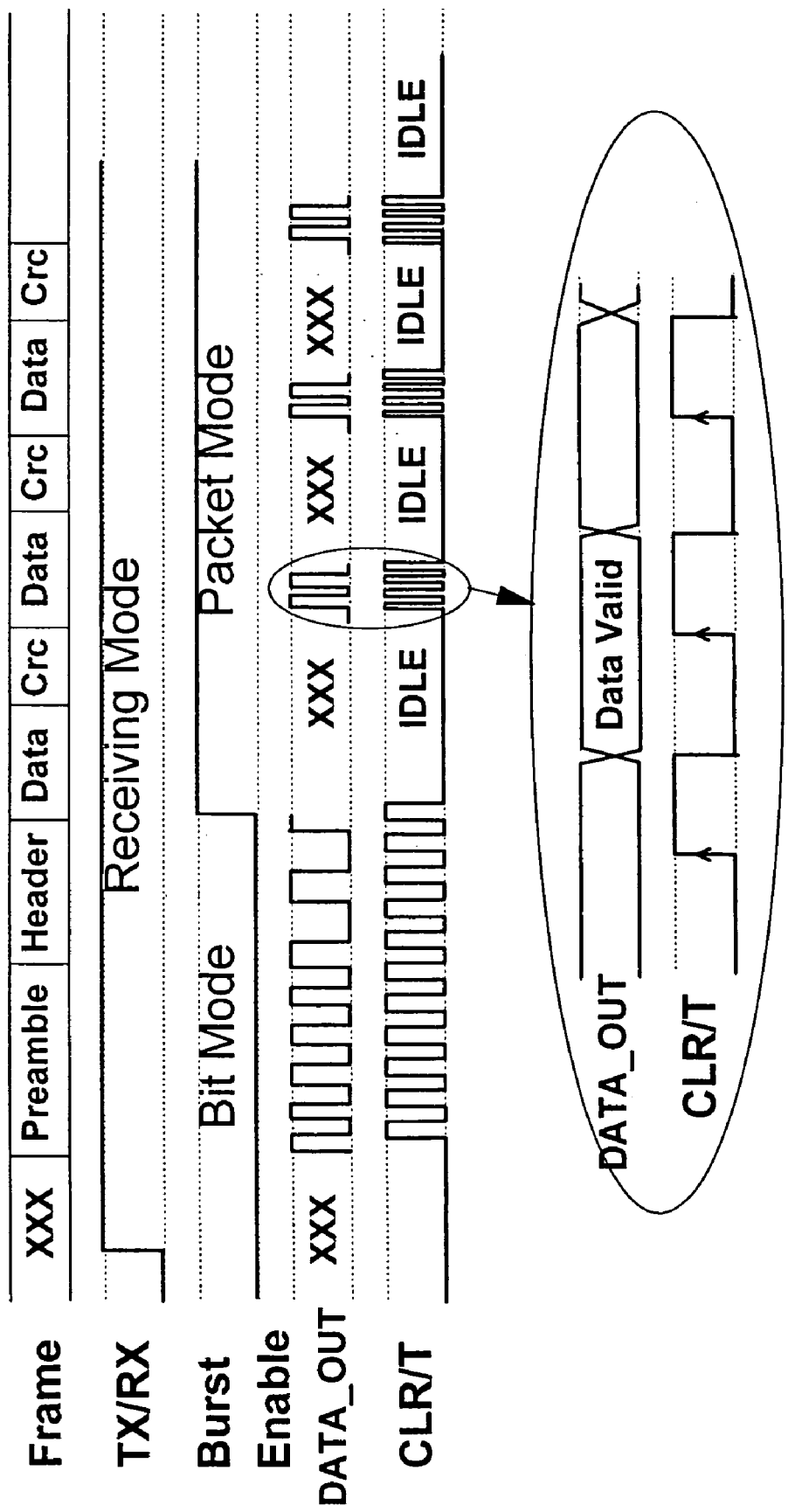

A timing diagram of the most important signals of the serial interface is depicted in FIG. 4b. Generally, a data frame FRAME of the stream DATA_OUT can be split into a PREAMBLE, a HEADER and in a payload portion containing the data bits DATA interleaved by synchronization signals CRC.

The signal TX/RX switches for enabling the TX_SECTION of the SERIAL_INTERFACE. Given that it is not possible to transmit the bits belonging to the PREAMBLE and/or to the HEADER in Packet Mode because the information carried is in their bit-rate, the BURST_ENABLE signal switches to transmit the PREAMBLE and the HEADER in Bit Mode and the data bits DATA in Packet Mode.

Switching from a transmission mode to the other is not the only possible switching scheme. It is possible to command any number of switchings from Packet Mode to Bit Mode and viceversa during the transmission of a single data frame FRAME. During transmission in Packet Mode, the clock signal CLR/T is idle in certain time intervals, allowing the reading of the signal DATA_OUT only when the above mentioned sequences of N pulses of the BURST_CLOCK are present. This is highlighted in the enlarged detail of FIG. 4b, wherein the DATA_OUT signal is read only when the CLR/T clock is not idle, and as depicted by way of an example in correspondence of its rising edge.

Figure 5A:
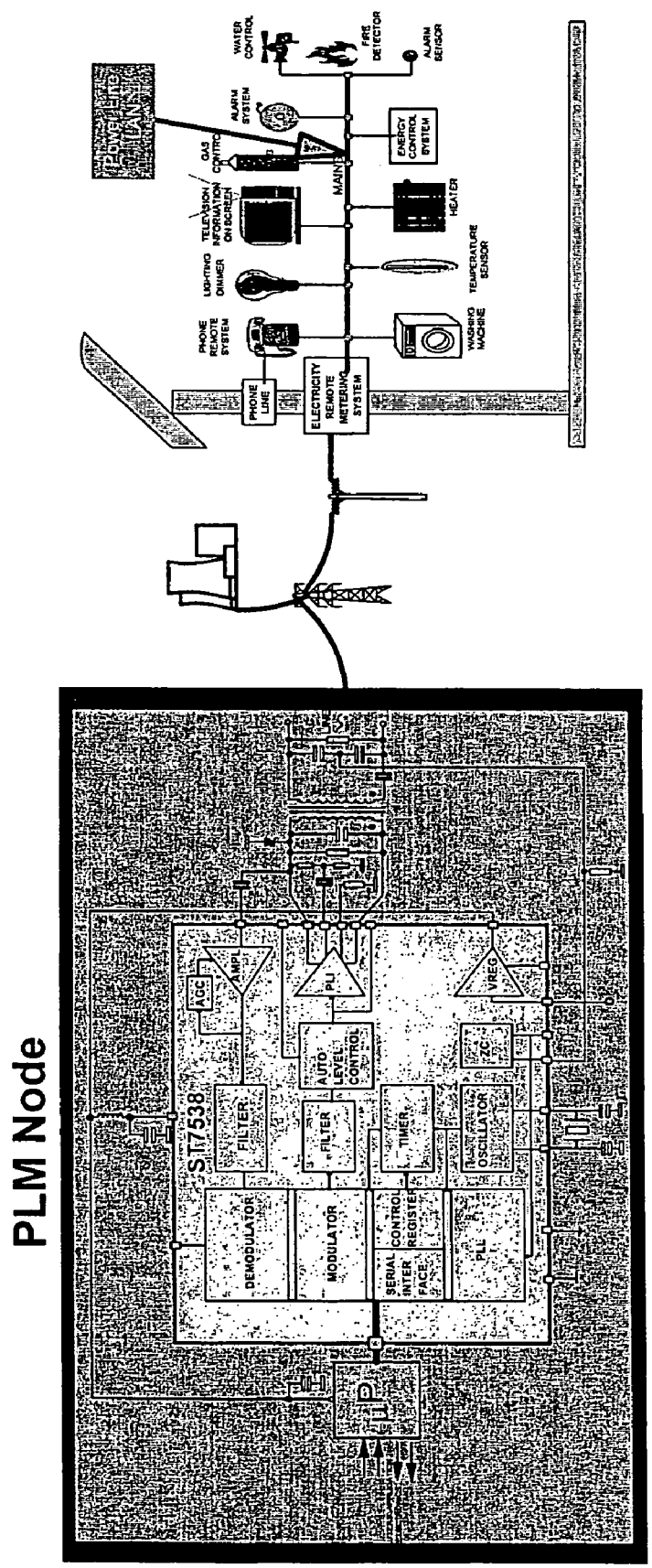
FIG. 5a illustrates a transceiving station coupled to a power distribution line according to the present invention.

A sample scheme of a circuit of a transceiving station according to the present invention is depicted in FIG. 5a. Substantially, the transceiving station is formed with the transceiver of FIG. 2. Fundamentally, the receiving station comprises a digital modem coupled to a data transmission line, which in the example shown is a line of a power distribution network.

A microprocessor $\mu P$ receives the data demodulated by the modem in Packet Mode or in Bit Mode through the interface circuit SERIAL_INTERFACE that couples the modem to the microprocessor $\mu P$. The SERIAL_INTERFACE changes the transmission mode to the microprocessor of the demodulated data from a Packet Mode to a Bit Mode during the transmission of each single data frame, without any bit loss during the switching from one mode to the other.

Figure 5B:
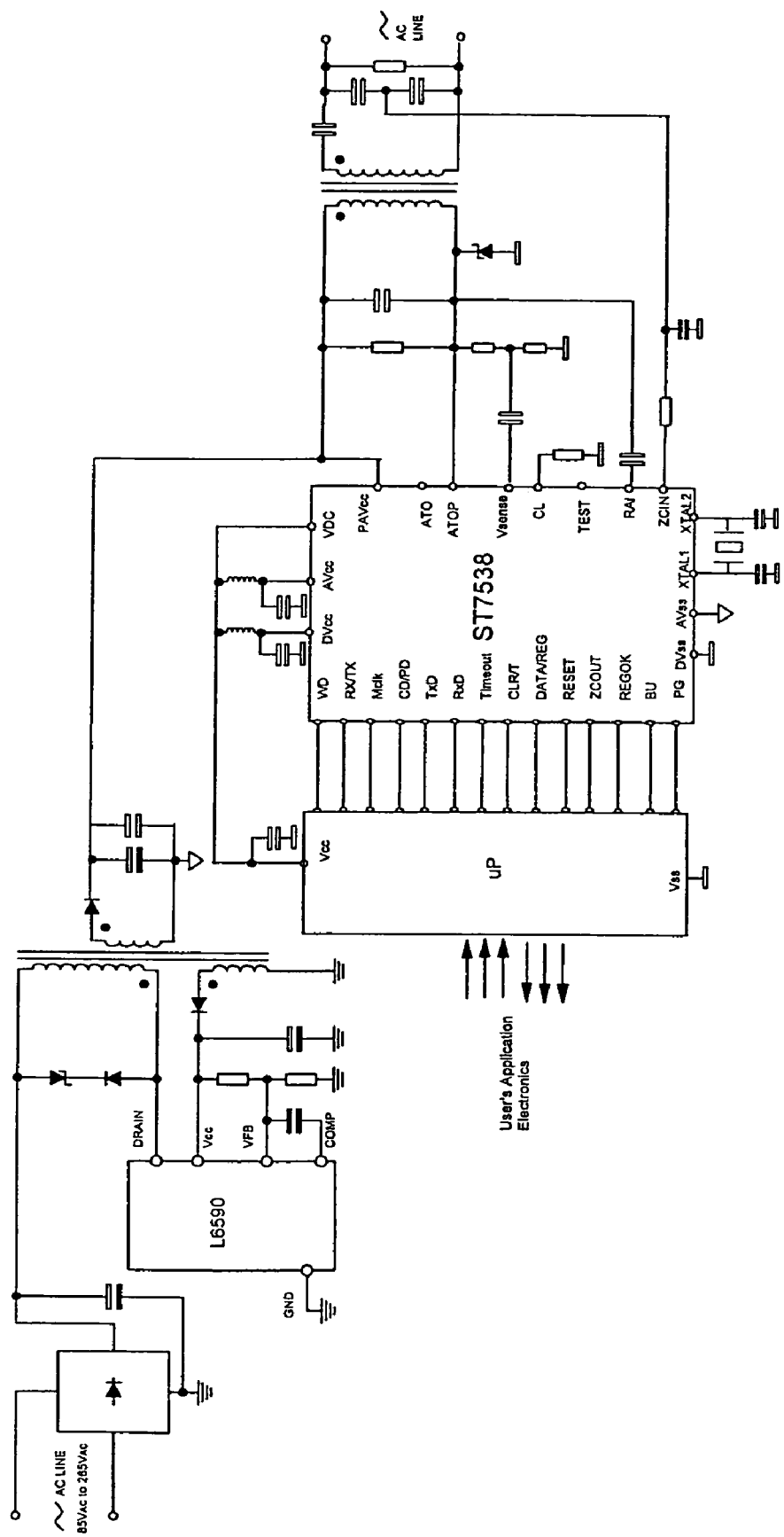
FIG. 5b illustrates a circuit according to the present invention for coupling the transceiver to a power network line.

A suitable circuit to couple the transceiver of the invention to the electrical power line is depicted in FIG. 5b. The station may me made able to control electric loads connected to the power line by using the frequency bands that are reserved for this function. The station monitors the presence in the selected band of an energy level greater than a certain pre-established maximum threshold and accesses the transmission channel only if such a pre-established threshold may be equal to 80 dB$\mu$V. This meets the requirements of CENELEC EN 50065-1 rules that define the European standard in accessing electrical power lines for communications relative to home applications.

To improve the control of electric loads by avoiding undesired overvoltages on switches, the integrated transceiver of the invention includes a circuit ZC for detecting the zero-crossing of the network voltage.

That which is claimed is:

1. A data transceiver station comprising:
a modem to be connected to an electrical power line for receiving digital data;
a microprocessor connected to said modem for receiving demodulated digital data therefrom according to a Packet Mode transmission or a Bit Mode transmission; and
an interface circuit connected between said microprocessor and said modem and switching between a Packet Mode and a Bit Mode during transfer of the demodulated digital data to said microprocessor, the switching being based upon whether the received digital data is a Packet Mode transmission or a Bit Mode transmission.

2. A data transceiver station according to claim 1 wherein the electrical power line is part of an electrical power distribution network; and wherein said modem generates information on detection of a voltage level greater than a threshold in a frequency band selected for transmission over the electrical power line.

3. A data transceiver station according to claim 2 further comprising a zero-crossing circuit for detecting a zero-crossing of the voltage level and for producing a logic signal in response thereto that is input to said modem.

4. A data transceiver station according to claim 1 wherein said serial interface comprises a receiver section and a transmitter section connected thereto, said transmitter section comprising:
a logic processing circuit for organizing the demodulated digital data into a stream of data structured in packets, and
a multiplexer having a first input for receiving the demodulated digital data and a second input for receiving the stream of data structured in packets, and an output for providing the demodulated digital data or the stream of data structured in packets based upon a selection signal.

5. A data transceiver station according to claim 1 further comprising an oscillator connected to said modem for providing carrier frequencies thereto.

6. A data transceiver station according to claim 4 further comprising a memory connected to said logic processing circuit.

7. A data transceiver station according to claim 4 wherein said logic processing circuit has an input for receiving a first clock signal corresponding to the demodulated digital data; and wherein said logic processing circuit provides a third clock signal comprising a sequence of N pulses having a second clock signal that is a multiple of a frequency of the first clock signal.

8. A data transceiver station according to claim 4 wherein said multiplexer has a third input for receiving the first clock signal and a fourth input for receiving a fourth clock signal equal to the third clock signal or to the first clock signal based upon whether the selection signal corresponds to the demodulated digital data or the stream of data structured in packets.

9. A data transceiver station according to claim 4 further comprising a memory connected to said logic processing circuit, wherein said memory comprises:
a first register having a first input for receiving the demodulated digital data and a second input for receiving a first register clock signal, and an output for providing a first data signal; and
a second register having a first input for receiving the demodulated digital data and a second input for receiving a second register clock signal, and an output for providing a second data signal.

10. A data transceiver station according to claim 9 wherein said logic processing circuit further comprises:
a first counter having an input for receiving the first clock signal and an output for providing a first end-computation signal when N pulses have been counted; and
a second counter having an input for receiving a second clock signal, and an output for providing a second end-computation signal that is enabled by the first end-computation signal and disabled when said second counter counts N pulses of the second clock signal.

11. A data transceiver station according to claim 9 wherein said logic processing circuit further comprises:
a second multiplexer having a first input for receiving the demodulated digital data and a second input for receiving the third clock signal, and an output for providing the first register clock signal corresponding alternately to the third clock signal and to the first clock signal based upon a switching signal that toggles every N pulses of the first clock signal; and
a third multiplexer having a first input for receiving the demodulated digital data and a second input for receiving the third clock signal, and an output for providing the second register clock signal corresponding alternately to the third clock signal and to the first clock signal based upon the switching signal.

12. A data transceiver station according to claim 11 wherein said logic processing circuit further comprises a logic AND gate having a first input for receiving the second clock signal and a second input for receiving the second end-computation signal, and an output for providing the third clock signal as periodic sequences of the N pulses when the second clock signal is output at each enablement of the first end-computation signal.

13. A data transceiver station according to claim 12 wherein said logic processing circuit further comprises a fourth multiplexer having a first input for receiving the first data signal and a second input for receiving the second data signal, and an output for providing a third data signal corresponding to the first data signal or to the second data signal based upon the switching signal.

14. A data transceiver station according to claim 1 wherein said modem comprises at least one control register for storing the received digital data and for controlling verification thereof.

15. A data transceiver station according to claim 1 wherein the demodulated digital data is based upon frequency shift keying demodulation.

16. A monolithic integrated multichannel transceiver comprising:
a modem having an input to be connected to an electrical power line of an electrical distribution power network for receiving digital data and an output for providing a demodulated bit stream in response to the received digital data, said modem for detecting a voltage level in a frequency band selected for transmission over the electrical power line and for providing a logic signal when the voltage level exceeds a threshold;
a serial interface connected to said modem for providing a selection signal based upon the received digital data, said serial interface comprising a receiver section and a transmitter section connected thereto, said transmitter section comprising
a logic processing circuit for organizing the demodulated bit stream into a stream of data structured in packets, and a multiplexer having a first input for receiving the demodulated bit stream and a second input for receiving the stream of data structured in packets, and an output for providing the demodulated bit stream or the stream of data structured in packets based upon the selection signal; and a zero-crossing circuit connected to an external coupling circuit connected to the electrical power line for detecting a zero-crossing of the voltage level thereon and for providing an output logic signal to said modem in response to the zero-crossing of the voltage level.

17. A monolithic integrated multichannel transceiver according to claim 16 wherein the demodulated bit stream corresponds to a Bit Mode transmission and the stream of data structured in packets corresponds to a Packet Mode transmission.

18. A monolithic integrated multichannel transceiver according to claim 16 wherein said modem comprises at least one control register for storing the received digital data and for controlling verification thereof.

19. A monolithic integrated multichannel transceiver according to claim 16 further comprising an oscillator connected to said modem for providing carrier frequencies thereto.

20. A monolithic integrated multichannel transceiver according to claim 16 further comprising a memory connected to said logic processing circuit.

21. A monolithic integrated multichannel transceiver according to claim 16 further comprising a power interface circuit connected to said modem and for driving the external coupling circuit.

22. A monolithic integrated multichannel transceiver according to claim 16 wherein said logic processing circuit has an input for receiving a first clock signal corresponding to the demodulated bit stream; and wherein said logic processing circuit provides a third clock signal comprising a sequence of N pulses having a second clock signal that is a multiple of a frequency of the first clock signal.

23. A monolithic integrated multichannel transceiver according to claim 16 wherein said multiplexer has a third input for receiving the first clock signal and a fourth input for receiving a fourth clock signal equal to the third clock signal or to the first clock signal based upon whether the selection signal corresponds to the demodulated bit stream or the stream of data structured in packets.

24. A monolithic integrated multichannel transceiver according to claim 16 further comprising a memory connected to said logic processing circuit, wherein said memory comprises:

a first register having a first input for receiving the demodulated bit stream and a second input for receiving a first register clock signal, and an output for providing a first data signal; and a second register having a first input for receiving the demodulated bit stream and a second input for receiving a second register clock signal, and an output for providing a second data signal.

25. A monolithic integrated multichannel transceiver according to claim 24 wherein said logic processing circuit further comprises:

a first counter having an input for receiving the first clock signal and an output for providing a first end-computation signal when N pulses have been counted; and a second counter having an input for receiving a second clock signal, and an output for providing a second end-computation signal that is enabled by the first end-computation signal and disabled when said second counter counts N pulses of the second clock signal.

26. A monolithic integrated multichannel transceiver according to claim 24 wherein said logic processing circuit further comprises:

a second multiplexer having a first input for receiving the demodulated bit stream and a second input for receiving the third clock signal, and an output for providing the first register clock signal corresponding alternately to the third clock signal and to the first clock signal based upon a switching signal that toggles every N pulses of the first clock signal; and a third multiplexer having a first input for receiving the demodulated bit stream and a second input for receiving the third clock signal, and an output for providing the second register clock signal corresponding alternately to the third clock signal and to the first clock signal based upon the switching signal.

27. A monolithic integrated multichannel transceiver according to claim 25 wherein said logic processing circuit further comprises a logic AND gate having a first input for receiving the second clock signal and a second input for receiving the second end-computation signal, and an output for providing the third clock signal as periodic sequences of the N pulses when the second clock signal is output at each enablement of the first end-computation signal.

28. A monolithic integrated multichannel transceiver according to claim 26 wherein said logic processing circuit further comprises a fourth multiplexer having a first input for receiving the first data signal and a second input for receiving the second data signal, and an output for providing a third data signal corresponding to the first data signal or to the second data signal based upon the switching signal.

29. A method of using a data transceiver station for exchanging digital data over an electrical power line, the data transceiver station comprising a modem connected to the electrical power line, an interface circuit connected to the modem, and a microprocessor connected to the interface circuit, the method comprising:

demodulating the digital data using the modem;

switching the interface circuit between a Packet Mode and a Bit Mode based upon whether the received digital data is a Packet Mode transmission or a Bit Mode transmission; and transferring the demodulated digital data from the modem to the microprocessor.

30. A method according to claim 29 wherein demodulating the digital data comprises providing a demodulated bit stream to the serial interface.

31. A method according to claim 30 further comprising organizing the demodulated bit stream into a stream of data structured in packets.

32. A method according to claim 31 further comprising providing to a first input of a multiplexer the demodulated bit stream and to a second input of the multiplexer the stream of data structured in packets, and providing at an output of the multiplexer the demodulated bit stream or the stream of data structured in packets based upon a selection signal.

33. A method according to claim 32 further comprising generating the selection signal based upon the received digital data.

34. A method according to claim 29 further comprising:

detecting a zero-crossing of a voltage level on the electrical power line; and providing an output logic signal to the modem in response to the zero-crossing of the voltage level.

35. A method according to claim 29 further comprising:
  detecting a voltage level in a frequency band selected for transmission over the electrical power line; and
  producing a logic signal when the voltage level exceeds a threshold.

36. A method according to claim 29 wherein the modem comprises at least one control register for storing the digital data and for controlling verification thereof.

* * * * *